United States Patent [19]

Shoji et al.

[11] Patent Number: 4,680,625
[45] Date of Patent: Jul. 14, 1987

[54] METHOD AND APPARATUS FOR MULTICOLOR IMAGE FORMING

[75] Inventors: Hisashi Shoji; Satoshi Haneda; Seiichiro Hiratsuka, all of Hachioji, Japan

[73] Assignee: Konishiroku Photo Industry Co., Ltd., Tokyo, Japan

[21] Appl. No.: 753,335

[22] Filed: Jul. 9, 1985

[30] Foreign Application Priority Data

| Jul. 18, 1984 | [JP] | Japan | 59-150448 |
| Jul. 18, 1984 | [JP] | Japan | 59-150449 |
| Jul. 18, 1984 | [JP] | Japan | 59-150450 |
| Jul. 18, 1984 | [JP] | Japan | 59-150451 |

[51] Int. Cl.$^4$ .................................. H04N 1/46
[52] U.S. Cl. ......................... 358/80; 346/157; 358/75
[58] Field of Search ............. 358/75, 80; 346/157

[56] References Cited

U.S. PATENT DOCUMENTS

| 3,230,303 | 1/1966 | Macouski | 346/157 |
| 4,205,322 | 5/1980 | Tsuzuki | 346/157 |
| 4,448,867 | 5/1984 | Ohkubo | 346/157 |
| 4,543,613 | 9/1985 | Sakamoto | 346/157 |
| 4,558,356 | 12/1985 | Toda | 358/80 |
| 4,590,515 | 5/1986 | Wellendorf | 358/80 |

Primary Examiner—Howard W. Britton
Attorney, Agent, or Firm—Jordan B. Bierman

[57] ABSTRACT

An apparatus for forming a multicolor image having a color correcting device with an operational processor for correcting and converting an image data composed of a plurality of color data. The apparatus has a device for forming a latent image on an image retainer based on the results of the color correction executed by the color correction device and a plurality of developing devices for developing the latent image thus formed by the device using toner of mutually different colors in order to form the multicolor image by successively forming a plurality of color toner images on the image retainer.

13 Claims, 33 Drawing Figures

F I G. 14
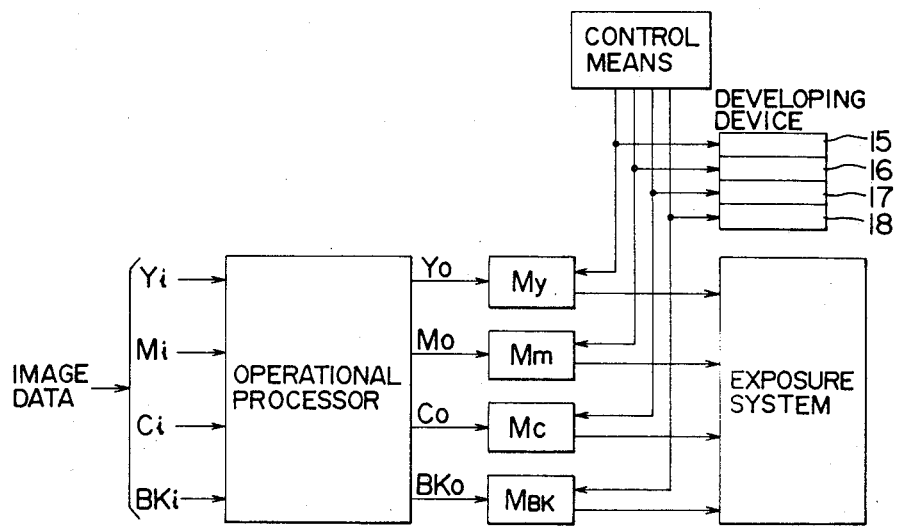
F I G. 15 (a)
(UNPROCESSED DATA)
F I G. 15 (b)
(PROCESSED DATA)
F I G. 16 (a)
(UNPROCESSED DATA)
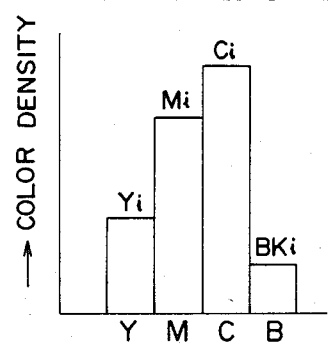
F I G. 16 (b)
(PROCESSED DATA)
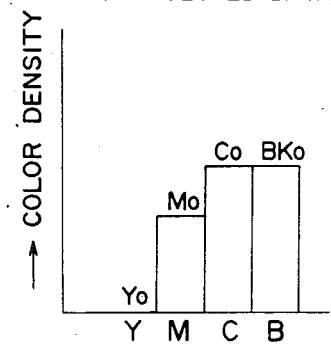

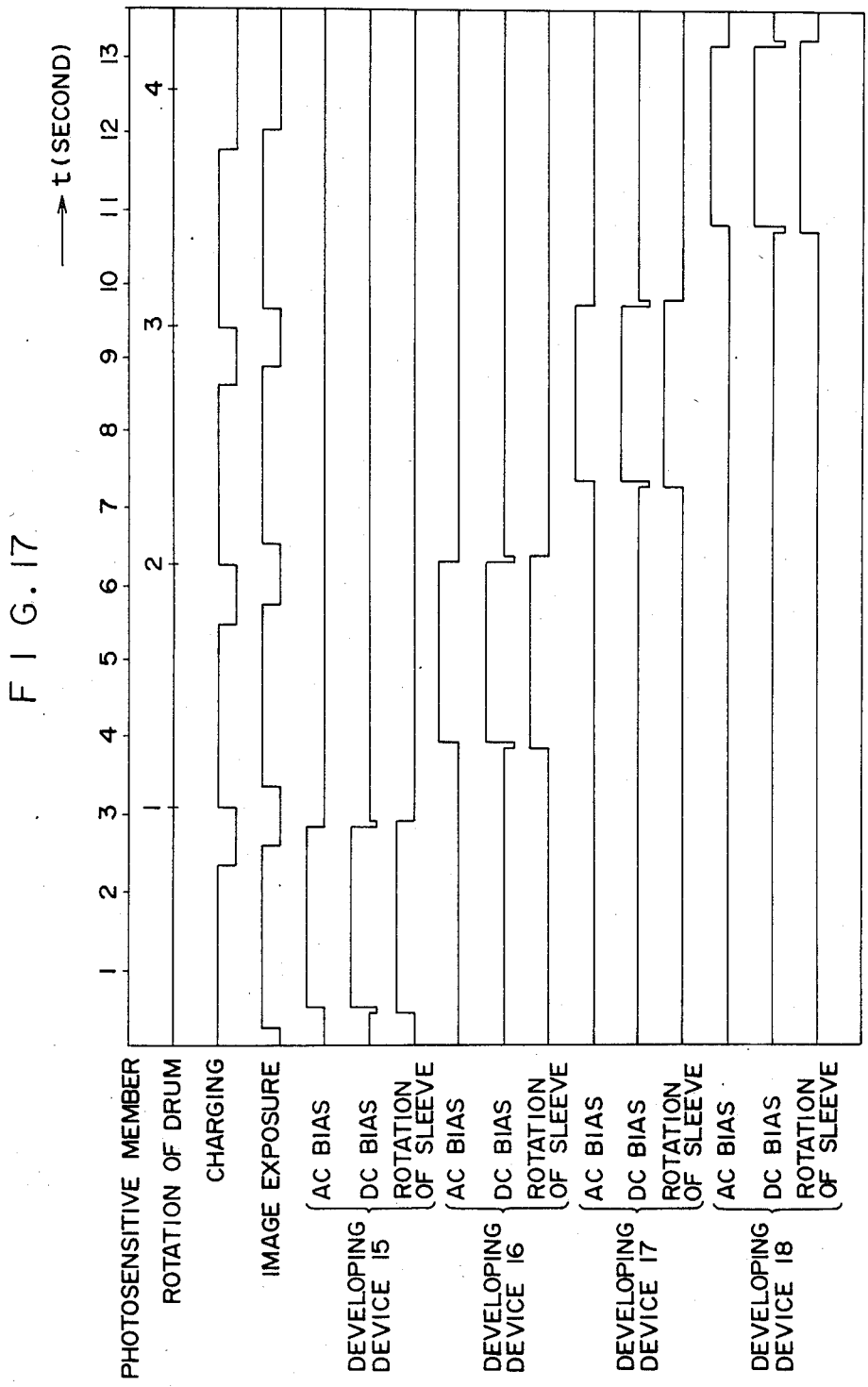

FIG. 18(a)
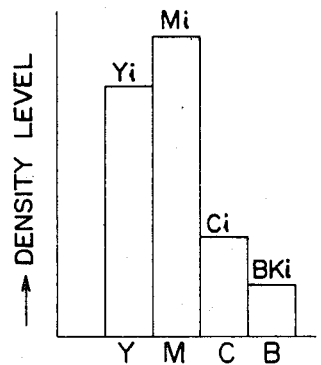
FIG. 19(a)
FIG. 18(b)
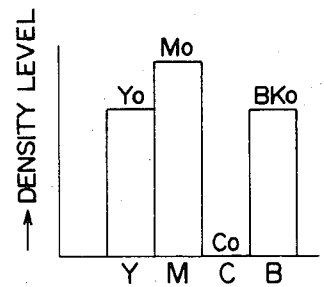
FIG. 19(b)
FIG. 18(c)
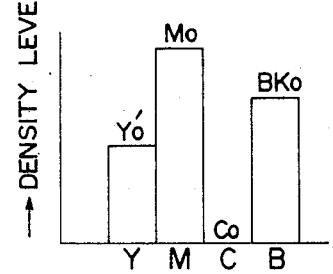
FIG. 19(c)
FIG. 20
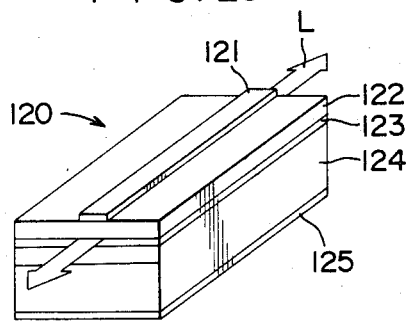

METHOD AND APPARATUS FOR MULTICOLOR IMAGE FORMING

BACKGROUND OF THE INVENTION

1. Field of the Invention:

This invention relates to a method and an apparatus for forming a multicolor image by successively forming different color toner images on an image retainer in the fields of electrostatic recording and electrophotographic reproducing applications.

2. Description of the Prior Art:

Heretofore, multicolor images have been obtained through the electrophotographic reproducing method wherein a series of reproducing processes, namely, charging, exposing, developing and transferring, is repeated on a component color basis and a plurality of different color toner images are piled on and transferred to transfer paper. For instance, an electrostatic image is formed separately through the processes by blue, green and red obtained through a separation filter and developed using yellow, magenta, cyan and, if necessary, black toner to form toner images which are superposed to form a multicolor image. However, this method of forming a multicolored image has disadvantages including the necessity of transferring the image to a transfer substance each time development by colors is completed, larger equipment and lengthy image-forming time; (2) necessity of assuring that the several color images are not out of register, i.e., misaligned relative to the repetition of the reproducing operation.

Although there has been devised a method for forming a multicolor image while solving the problems above by piling up and developing a plurality of toner images on a photosensitive member and completing the transfer process at one time, that method still has disadvantages in that the toner image obtained in the preceding stage is disturbed or a multicolor image lacks color balance because the developer in the following stage is blended with the toner contained in the developer in the preceding stage.

In order to remedy these shortcomings, there has also been disclosed a method, for instance, Japanese Patent Laid-Open No. 56-1144452, comprising preventing a photosensitive member from contacting a developer layer for developing a latent image formed on the photosensitive member, and laying an a.c. component on a d.c. bias applied to a developing device to fly the toner contained in the developer across a gap. In this method of forming a multicolor image, the image is not disturbed because the developer layer is prevented from rubbing the toner image formed in and up to the preceding stage. Referring to a flowchart of FIG. 1, the principle of the image forming method will be described. FIG. 1 illustrates changes in potential on the surface of a photosensitive member positively charged. In FIG. 1, there are shown an exposed portion PH of a photosensitive member, a non-exposed portion DA of the photosensitive member, a rise DUP in the potential produced by the positively charged toner T stuck to the exposed portion PH in the first development, and a rise CUP in the potential produced thereby in the exposed portion PH due to the second development.

The photosensitive member is uniformly charged by a scorotron charge device or the like and provided with a constant surface potential E. The surface potential E on the exposed portion PH is reduced to almost zero by first image exposure by means of a light source such a laser, cathode raytube or LED. At this time, the d.c. component causes a positive bias roughly equivalent to the surface potential E in the non-exposed portion to be applied to a developing device and the positively charged toner T in the developing device is allowed to stick to the exposed portion PH having a relatively low potential, so that a first visible image may be formed. The potential in the region where the visible image has been formed is increased by the DUP because of the positively charged toner T adhering thereto and, as the region is charged secondly by the charge device, the potential is further raised by the CUP, whereby the initial surface potential E is obtained as in the case of the non-exposed portion. Subsequently, second image exposure is provided on the surface of the photosensitive member where uniform surface potential has been obtained to form an electrostatic latent image and a second visible image is obtained through the similar developing operation. A multicolor toner image is obtained on the photosensitive member by repeating the above processes and the image is transferred to recording paper and fixed with heat or under pressure to obtain a multicolor image. The toner and charge left on the photosensitive member is cleaned in preparation for the formation of the following multicolor image. In the above method of forming a multicolor image, the second and following charging may be omitted. In case the charging is repeated each time without the omission, a charge eliminating process may be added before the charging. Moreover, the exposure beam source used for each image exposure may be a similar or different one.

In the above method of forming a multicolor image, for instance, yellow, magenta, cyan and black color toner images are often superposed on the photosensitive member and the reason for this includes the following: Although a black image should be obtained by superposing the three primary colors of yellow, magenta and cyan according to the principle of the subtractive color process, clear black characters and diagrams can hardly be reproduced only by the three primary colors, because toner in actual use for the three primary colors has not an ideal adsorptive wavelength range and these color toner images are not easily positionally synchronized.

As a result, it is arranged to obtain a fourcolor image which is a more faithful reproduction of the document by superposing black as well as three primary color toner images as above described.

In the method of forming a multicolor image, reversal development is also used for developing an electrostatic latent image. In reversal development, it is only necessary to expose a portion where a toner image is formed on the photosensitive member but not to expose the background without any gap as is the case with normal development, so that a latent image may relatively readily be formed on the photosensitive member with a toner image already formed. Moreover, the advantage is that the life of the photosensitive member can be prolonged as it is wear-resistant. Further, because the second and following charging are effected at the same polarity as the toner, electrostatic transfer is implemented without trouble.

As a method of forming a latent image for forming a multicolor image, there are those of forming a latent image by directly injecting a charge into an image retainer using a multi-stylus electrode and of forming a magnetic latent image using magnetic head in addition to that of forming an electrostatic latent image by uniformly charging the photosensitive member and image exposure.

Although each of these methods of forming a latent image allows the expression of gradation, the problem is that they are not suitable for high-speed recording. Moreover, because the gradation thereby expressed through such methods is the so-called multistage gradation, a greater capacity for image data is required. Accordingly, there has been proposed a method for providing image data of gradation in the form of binary values, the method comprising converting each picture element to a binary value for recording purposes and expressing dummy gradation based on the distribution of the binary values to minimize the capacity of image data. The density pattern method of FIG. 2 and the dither method of FIG. 3, for instance, are used to express the gradation of an image through the above method of forming image data of gradation in the binary form.

The density pattern method shown in FIG. 2 presupposes the conversion of one picture element into a plurality of elements. In FIG. 2, there are shown a document 1a, each picture element 5a having gradation; a sample 2a for extracting a picture element 5a representing the typical density of a matrix of the document 1a and processing the value in terms of a threshold; a matrix 3a having the threshold density of MxN corresponding to the sample; and a pattern 4a provided in a binary form by comparing the threshold matrix 3a and the sample 2a.

The dither method shown in FIG. 3(a) is intended to convert a picture element into i picture elements A document 1b is divided into density matrices on a MxN picture element basis. A sample 2b is subjected to a threshold process corresponding to the density matrix of the document 1b, the threshold density matrix 3b of MxN corresponds to the sample 2b, and a pattern 4b is represented by a binary value obtained by comparing the threshold matrix 3b with the sample 2b.

In the conventional method of expressing gradation, it has been preferred to arrange dots in such a manner as to set a space frequency greater. In other words, the gradation is, as shown in FIG. 2 or 3(a), expressed by the number of dots of predetermined size (dot density). Particularly in the dither method, deterioration in resolution has been considered minimizable. However, in the aforementioned method of forming a multicolor image, gradation is incapable of being satisfactorily expressed because the resolving power is reduced as dots are welded together or an image looks coarse when the image is formed through the developing, transferring and fixing processes. The problem is that, for instance, even the resolving power in the order of 16 dots/mm required for the formation of an ordinary image cannot be maintained.

There are two methods of expressing the gradation of a multicolor image: (1) different color dots are prevented from overlapping; (2) different color dots are allowed to overlap at least partially. In the case of (1), the dots are formed in different places within the pattern 4a or 4b as shown in FIGS. 2 and 3(a). Accordingly, different color dots are distributed separately and two-dimensionally and a dummy mixture of colors is formed on recording paper.

In the case of (2), because different color dots are allowed to exist together within the pattern 4a or 4b, the different color dots are at least partially overlapped. In the case of (2), though development is implemented while the latent potential and the development bias are controlled, the formation of a desired latent image is not achieved because the overlapped potential is short and the toner dot which has already been developed impairs image exposure for the formation of the following toner dot. As a result, the tone of the preceding toner dot is excessively emphasized, which poses a problem in that the color balance of a multicolor image is broken. This constitutes a serious problem when the picture element is converted into a binary value to express the color balance. Particularly when the method of expressing decentralized gradation shown in FIGS. 2 and 3(a) is used, the problem becomes still more serious.

Even when the different color dots are not allowed to overlap in the case of (1), the same type of problem occurs because of an unavoidable error in positioning which is caused when a latent image of the different color toner image is formed and because of the diffusion of the dots. The problem is conspicuous when the method of expressing the decentralized gradation as in the case of (2) is employed.

When the aforementioned reversal development is used to form a color toner image on a photosensitive member, the following problems are posed: That is, as light for exposing an image is barely transmissible through a region where the toner has adhered from the development in the preceding stage, and the surface potential is thus sufficiently lowered, the toner is not allowed to stick to the photosensitive member in the following development stage. Even in the case of additive processes, because of difficulties in complete positioning and complete development corresponding to an electrostatically charged image, the same problem occurs. Accordingly, even if it is attempted to develop three primary yellow, magenta and cyan colors successively to express various tones, there will also be posed problems including the disturbance of the color balance and the image near the peripheral edge. Thus, a desired color image is not formed.

Heretofore, a bulb, fluorescent lamp, EL (electroluminescence) or LED (light emitting diode) has been used as a light source for providing image exposure on a photosensitive member in an apparatus for forming an image but the use of a laser as a light source for image exposure is on the increase. In other words, the laser beam offers special properties such as greater energy per area unit, coherence and higher directivity and, because it permits the formation of an image of good quality at high speed without noise, much importance has been attached thereto.

In the apparatus for forming an image using the laser beam, there is used, for instance, a He-Ne or He-Cd laser capable of emitting beams whose wavelength band ranging from 400 to 600 nm equivalent to the beam absorptive wavelength of a photosensitive member for forming an ordinary image.

A laser beam $L_3$ for image exposure is generated by a laser-beam exposure device 1 shown in FIG. 3(b). In FIG. 3(b), a signal 7 from a signal source 6 based on, for instance, image data, a facsimile or computer is applied to a driver 8 and an optical mudulator 5 such as an EOM (Electric Optical Modulator) or AOM (Acoustic Optical Modulator) is driven by the driver 8 and the intensity of a laser beam $L_1$ from a light source 2 is modulated. A laser beam $L_2$ after modulation is reflected from the reflecting surface of a polygon 9 rotate at high velocity and the laser beam $L_3$ thus reflected is irradiated on a photosensitive member 112 to form an electrostatically charged image. A lens 3 is one capable of converging at a diameter (for instance, 50 to 300 μm) where the laser beam $L_1$ can be modulated by the modulator 5, whereas a lens 4 is a collimate lens for obtaining the parallel laser beam $L_2$ after modulation. A lens 10 is a focusing $f\theta$ lens and 111 shows a scanning area by the laser beam $L_3$.

A gas laser is used as a beam source for image exposure in an apparatus for forming a multicolor image and, as a gas such as helium or neon is used as a substance for a conventional laser beam source, the disadvantages pointed out include an increase in the size of the beam source means and the price thereof. As shown in FIG. 3(b), the driver 8, the beam modulator 5 and the like are required to modulate the intensity of the laser beam $L_1$ and the laser beam $L_3$ must be generated without interruption while an image is being formed and this makes the amount of the light source energy enormous. Particularly in the case of the formation of a multicolor image, the amount of image data is large and therefore the exposure beam source should be the one which can be operated at high velocity and provide excellent tone reproducibility in order to maintain the color balance. Accordingly, a laser beam source in demand for an apparatus for forming a multicolor image should be not only capable of modulating the intensity of light in proportion to image data but also compact and less costly.

SUMMARY OF THE INVENTION

In view of the foregoing, an object of the present invention is to provide a method for forming a multicolor image with high resolution and an excellent color balance when color is reproduced by converting the picture element of a document image into a binary value.

In a method for obtaining a multicolor image by successively forming a plurality of toner images having different colors on an image retainer, the aforementioned object is attained by using dots constituting the toner image and expressing the graduation by the size of the dot. Particularly when the dots constituting the plurality of toner images are overlapped, the dots should preferably be arranged at mutually different angles.

The present invention presupposing the aforesaid construction features the use of a method for expressing gradation according to the size of the dots in place of a conventional method for expressing the gradation according to the dots being arranged in a decentralized mode.

Another object of the present invention is to provide an apparatus for forming a multicolor image capable of offering a disturbance-free clear image with an excellent color balance by processing a plurality of color data supplied in the operational processor to form a color image using fewer color toners compared with that of the color data.

In an apparatus for forming a color image by successively forming a plurality of different color toner images on the image retainer, the apparatus comprising means for correcting color image data composed of a plurality of different color data, means for forming a latent image on the image retainer based on what has been corrected by the means above in terms of colors and a plurality of developing means for developing the latent image formed by the means above with different color toner, the object is attained by using an operational processor for converting the image data based on the results obtained from said color correcting means for comparing and computing the plurality of color data, the operational processor being used to subtract data designating the lowest density among the data composed of yellow, magenta and cyan primary colors from each of the three primary color data so as to treat the result as a black component.

Still another object of the present invention is to provide an apparatus for forming a multicolor image capable of offering a disturbance-free clear image with an excellent color balance by correcting and converting the tone of image data based on external instructions and further forming the color image employing the converted data. The object is attained by an apparatus for forming a color image by successively forming a plurality of different color toner images on the image retainer, the apparatus comprising means for correcting color image data composed of a plurality of different color data, means for forming a latent image on the image retainer based on what has been corrected by the means above in terms of colors and a plurality of developing means for developing the latent image formed by the means above with different color toner, the color correcting means having an operational processor for converting the tone of the image data according to external instructions.

A further object of the present invention is to provide an apparatus for forming a multicolor image using a compact, low-cost, high-speed modulation laser beam source therefor.

The object can be attained by an apparatus for forming a multicolor image comprising at least one image exposure means for forming an electrostatically charged image by irradiating laser beams on a photosensitive member uniformly charged and a plurality of developing devices for developing the electrostatically charged image, the laser beam being semiconductor laser beam whose intensity has been modulated.

The present invention features the use of a highly efficient laser beam source for controlling current by directly applying the data signal to the semiconductor, allowing the modulated laser beam to be oscillated in terms of its intensity and forming different color electrostatic latent images on a photosensitive member using the laser beam.

BRIEF DESCRIPTION OF THE DRAWINGS

FIG. 14 is a block diagram of an operational processor for color correcting means.

FIGS. 15(a), 15(b), 16(a), 16(b) are diagrams illustrating the algorithm of operational processing in the operational processor.

FIG. 17 is a timing chart illustrating the operational timing of an image forming device.

FIGS. 18(a)~18(c), FIGS. 19(a)~19(c) are diagrams illustrating the algorithm of operation processing in another embodiment of the present invention.

FIG. 20 is a perspective view of a galliumarsnic semiconductor device.

DESCRIPTION OF THE PREFERRED EMBODIMENT

Figure 1:
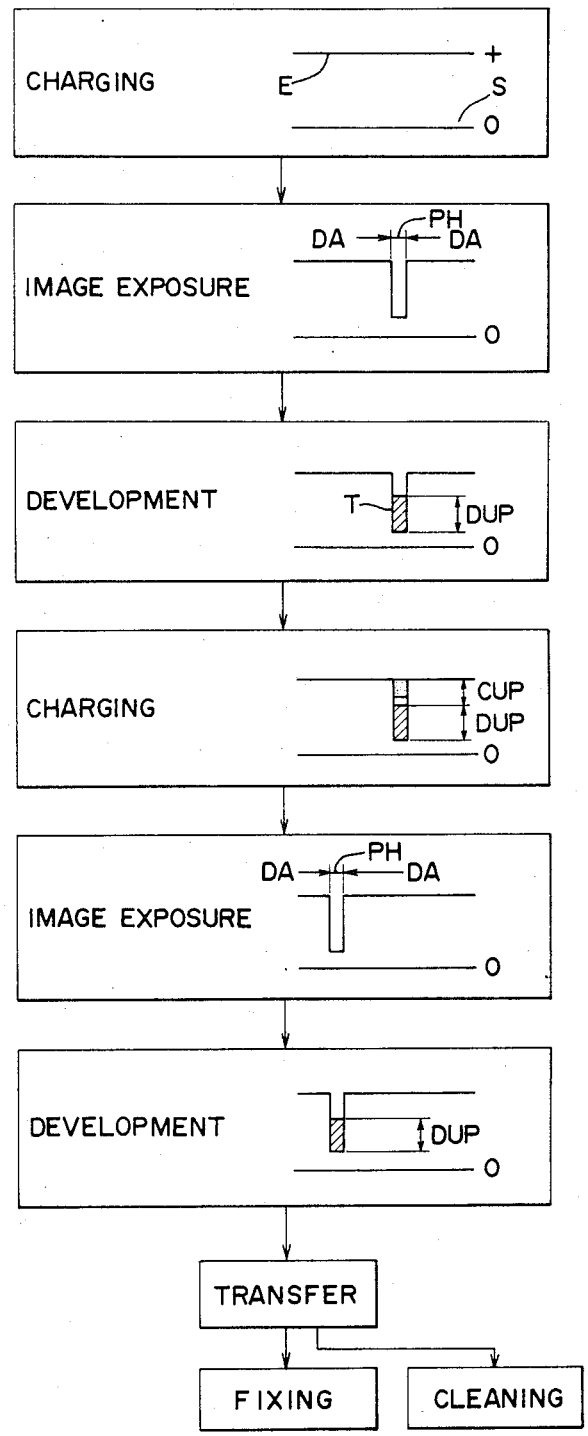
FIG. 1 is a flowchart illustrating the principle of a conventional method for forming a multicolor image.
Figure 2:
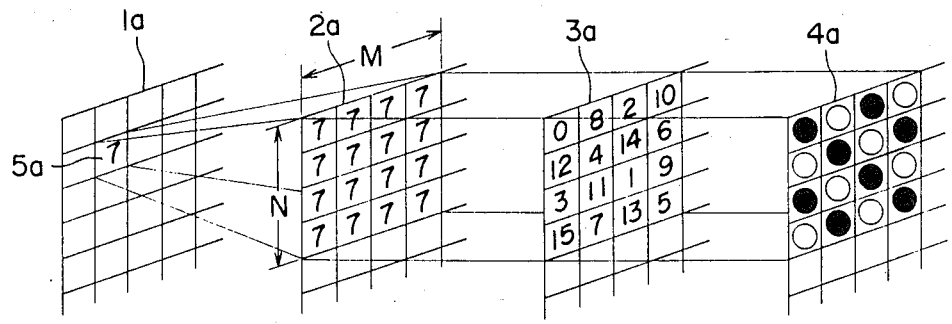
FIG. 2 is the density pattern method as one of the methods of expressing the tone of a multicolor image.
Figure 3A:
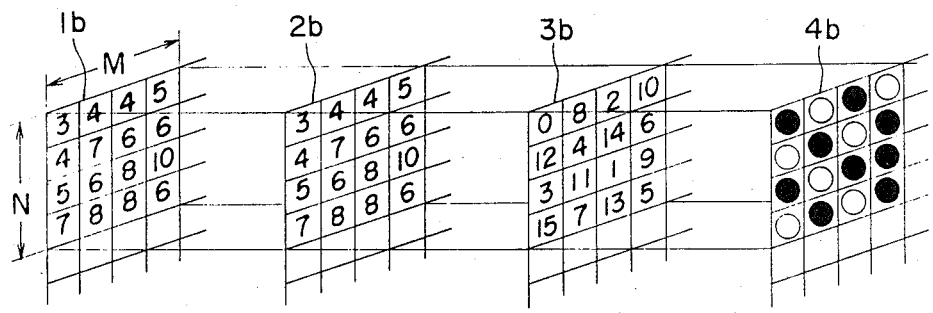
FIG. 3(a) is a diagram illustrating the dither method.
Figure 3B:
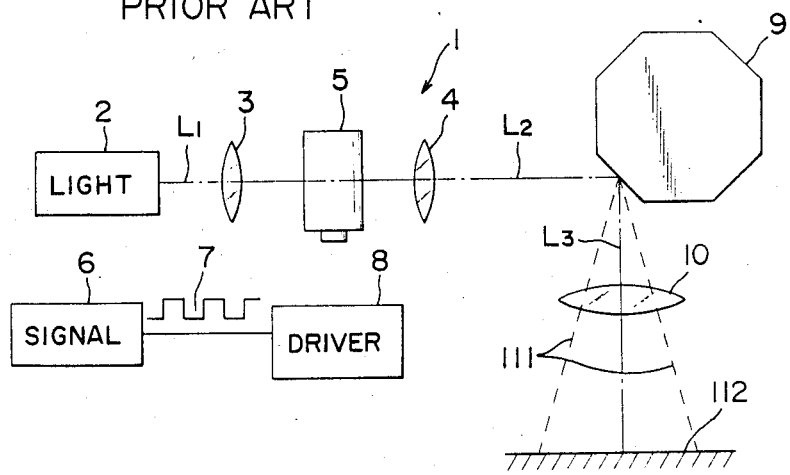
FIG. 3(b) is a diagram illustrating an image exposure system using a conventional laser beam.

Referring now to the drawings, the present invention will be described. However, the applications of the present invention are not limited to the following embodiments thereof. A method for forming image data will be described first.

In the method of forming a multicolor image acdording to the present invention, an output signal of an image pickup element which has scanned a multicolored document, a transmission signal from another apparatus such as a facsimile or data stored in a memory is utilized as image data. The image data is represented by three yellow, magenta and cyan primary color data $Yi$, $Mi$, $Ci$ and black data $BKi$. When the multicolor image is formed, the image data is sent to an operational processor in a color correcting section of FIG. 4 and the operational equation (1), for instance, is used to compute desired four color data.

Equation (1):

$$Ym = \alpha_1 \, Yi - \beta_1 min(Yi, Mi, Ci)$$

$$Mm = \alpha_2 Mi - \beta_2 min(Yi, Mi, Ci)$$

$$Cm = \alpha_3 Ci - \beta_3 min(Yi, Mi, Ci)$$

$$BKm = \alpha_4 BKi + \beta_4 min(Yi, Mi, Ci)$$

where $Ym$, $Mm$, $Cm$ = data after operation; $Yi$, $Mi$, $Ci$ = image data input; $\alpha_1$, $\alpha_2$, $\alpha_3$, $\alpha_4$, $\beta_1$, $\beta_2$, $\beta_3$, $\beta_4$ = color correction coefficient based on external factors such as developing conditions; and $min(Yi, Mi, Ci)$ = tone having the minimum density value among three yellow, magenta and cyan primary colors.

Figure 5:
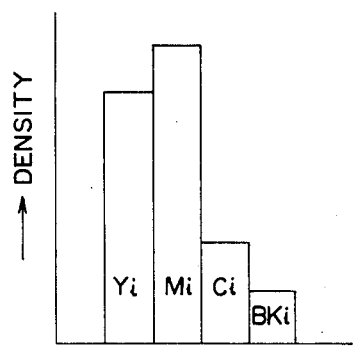
FIG. 5 is a histogram of four primary color density data.
Figure 6:
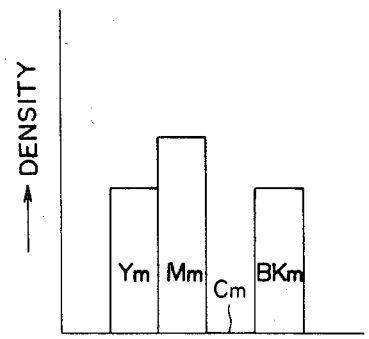
FIG. 6 is a histogram of the density data after color correction.

To aid in understanding the equation (1), description will be given as follows by taking $\alpha_1 \sim \alpha_4$, $\beta_1 \sim \beta_4$ being 1 in all cases as an example. Given that the tone of the minimum density is cyan (Ci) as shown in FIG. 5, the black component is obtained based on the principle of the subtractive color process by gathering the quotient obtained by subtracting the density equivalent to the cyan from each of the three primary colors. The black component is added to the black data BKi to provide black image data shown in FIG. 6, whereas what is left after the cyan density or the equivalent has been subtracted from each of the three primary colors is treated as the image data of each of the three primary colors. It becomes thus possible to improve the color balance at the time of development, save toner consumption and increase the efficiency of the developing process.

Figure 4:
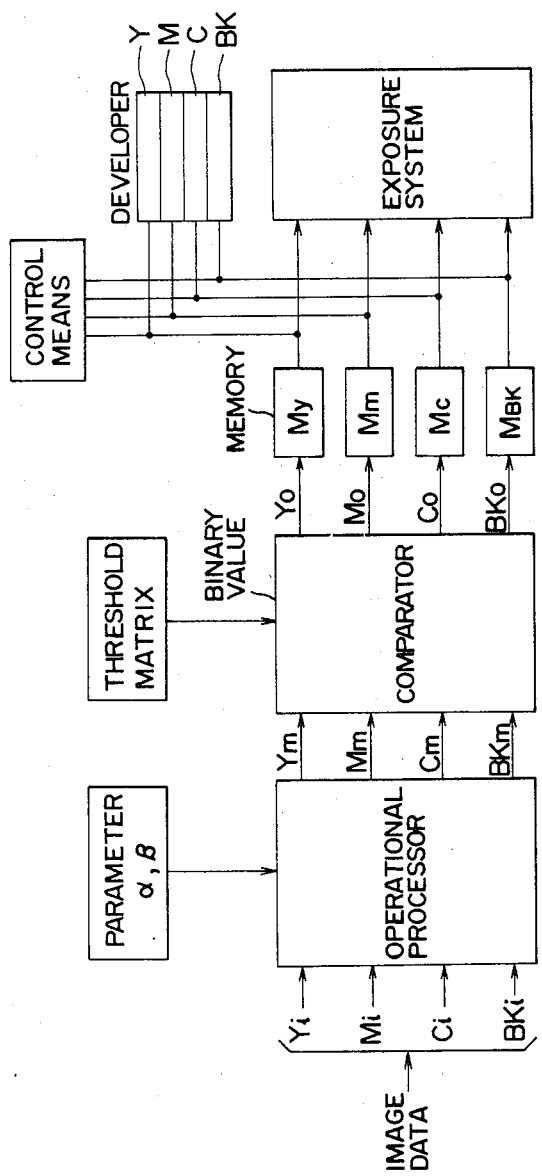
FIG. 4 is a block diagram of an image data correcting system.

The four color data $Ym$, $Mm$, $Cm$, $BKm$ corrected by the operational processor shown in FIG. 4 are compared with a threshold matrix (described later) before being converted into four color data $Yo$, $Mo$, $Co$, $BKo$ in a binary form. The data are stored in memories My, Mm, Mc, MBK and given to the exposure system according to the instructions from the control means, so that an electrostatically charged image can be formed on the photosensitive member. The electrostatically charged image should preferably be subjected to non-contact development using four kinds of developing devices driven by the control means, the developing devices containing yellow, magenta, cyan and black toner, respectively. Thus, toner images of four colors are superposed and formed on the photosensitive member and then transferred to and fixed on transfer paper fed in conjunction with the photosensitive member, so that a multicolor image is formed thereon.

Figure 7:
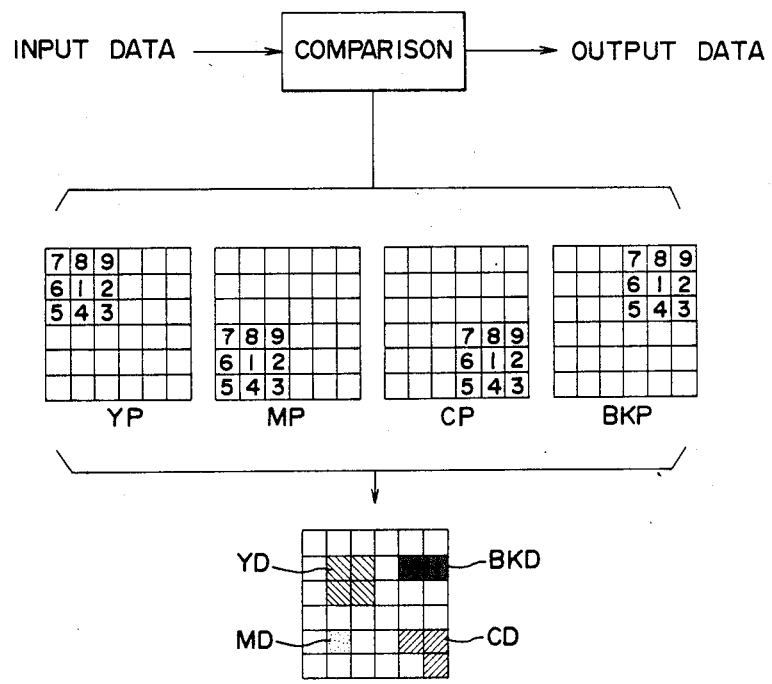
FIG. 7 is a threshold matrix of a different color dot separation type.
Figure 8C:
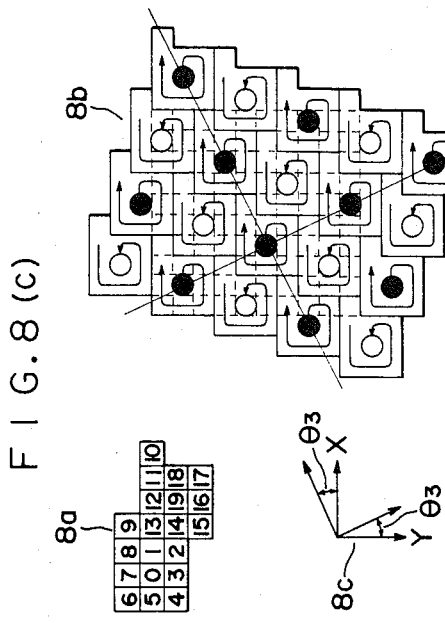
FIGS. 8(a)~8(d) are threshold matrices of a different color dot mixture type.
Figure 8D:
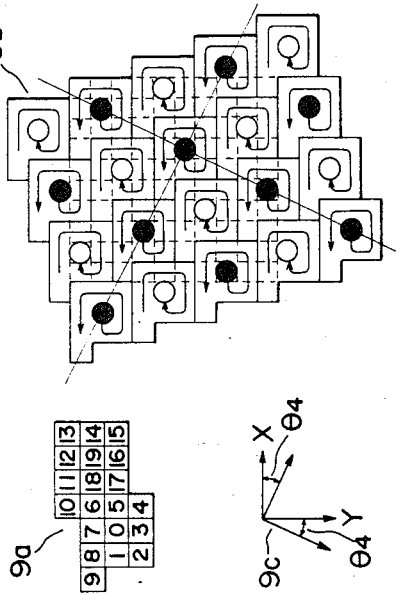
Figure 8A:
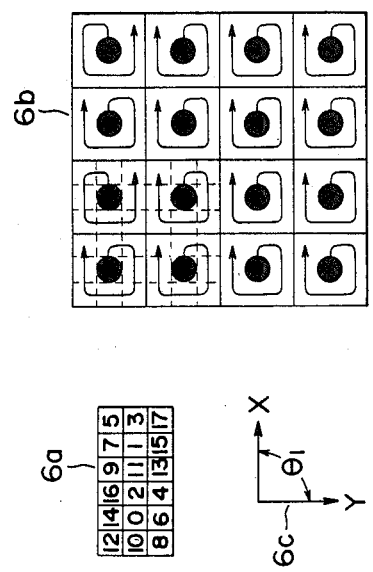
Figure 8B:
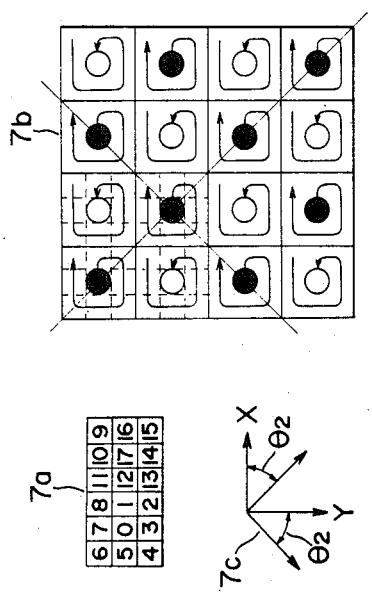

As a threshold matrix for use in the present invention, a volute type matrix YP, MP, CP or BKP distributed separately by colors as shown in FIG. 7 is used. The toner image obtained using the threshold matrix is composed of centralized dots shown by YD, MD, CD, BKD and the gradation thereof is expressed depending on the size of the dot. In addition, because the dot of each color is prevented from being overlapped with another, a clear multicolor image with an excellent color balance is obtained.

In addition to the method of expressing the tone separately by colors according to the present invention, it is also employed to express the gradation by distributing various color dots within the same matrix pattern and allowing dots to be overlapped. The problem in that case includes the difference in charging between the overlapped portion and what is free from overlapping and the impossibility of forming a desired latent image because the image exposure is prevented from reaching the image retainer as it is blocked by the preceding dot. According to the present invention, the aforesaid disadvantages are remedied by providing a centralized, instead of decentralized, dot construction even when different color dots are superposed and, as shown in FIGS. 8(a) through 8(d), the occurrence of a moire is prevented by changing the angles of different color dots and reducing the overlapping of different color dots, so that each tone may visually be emphasized.

6a, 7a, 8a, 9a show yellow, magenta and cyan threshold matrices, whereas 6b, 7b, 8b, 9b show the distributions of centralized color dots. 6c, 7c, 8c, 9c represent variations in angles of color dot distributions and, for instance, the angle $\theta_1$ of $6c = 90°$, the angle $\theta_2$ of $7c = 45°$, the angle $\theta_3$ of $8c = 26.6°$ and the angle $\theta_4$ of $9c = -26.6°$. With respect to the angle variations, all of the colors may be changed or otherwise the difference in color may be between two colors only. Accordingly, even if different color toner dots are superposed, a moire will be prevented from occurring because the angle at which the dots are arranged and reduction in the color balance will be decreased because the tone of each different color dot is visually demonstrated.

(EXAMPLE 1)

Referring now to the drawings, an embodiment 1 of the present invention will be described.

Figure 9:
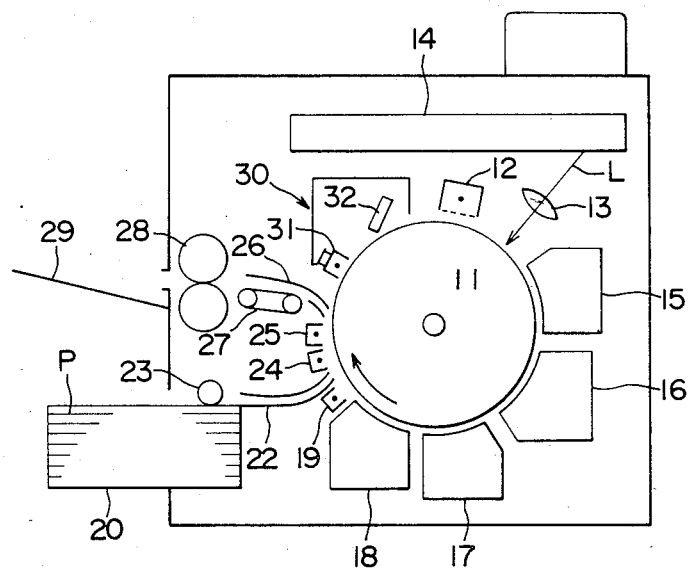
FIG. 9 is a cross sectional view of an apparatus for forming a multicolor image embodying the present invention.
Figure 10:
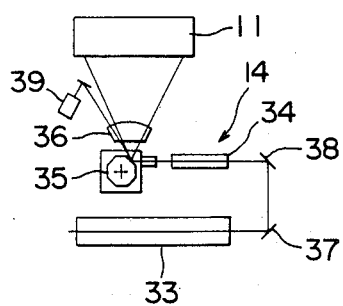
FIG. 10 is a cross sectional view of a laser applicable to the apparatus of FIG. 9.
Figure 11:
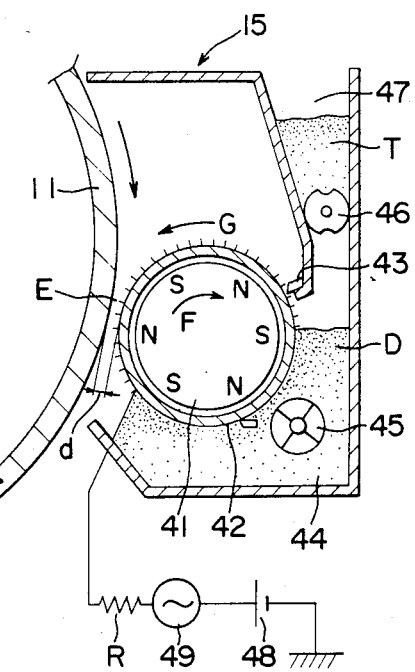
FIG. 11 is a cross sectional view of a developing device applicable to the apparatus of FIG. 9.

FIG. 9 is a cross sectional view of an apparatus for forming a multicolor image illustrating the embodiment of the present invention. FIG. 10 illustrates a laser applicable to the apparatus for forming an image of FIG. 9. FIG. 11 illustrates a developing device applicable to the apparatus for forming an image of FIG. 9. In FIG. 9, a photosensitive drum 11 is a selenium photosensitive member 120 mm in diameter which is caused to rotate at a linear velocity of 120 mm/sec in the direction of an arrow and uniformly charged with +600 V by a scorotron charge device 12. The uniform charge is subjected to image exposure by image exposure means and an electrostatically charged image is formed.

In other words, data Yi, Mi, Ci, BKi stored in the memory are supplied to the operational processor in the color correcting section of FIG. 4 and processed by the equation (1), whereby the data Ym, Mm, Cm, BKm subjected to the color correction are obtained. The data obtained are compared with the threshold matrices of FIGS. 7 or 8 and those Yo, Mo, Co, BKo in the form of a binary value are obtained. The data obtained are stored in memories My, Mm, Mc, MBK and supplied to the exposure system under instructions from the control means. In the present embodiment, a laser 14 of FIG. 10 is used as an exposure system and an image is exposed by a laser beam L from the laser 14, whereby an electrostatic latent image corresponding to each color is formed on the photosensitive member 11.

FIG. 10 shows the details of the laser 14. The helium-neon laser beam emitted from a transmission source 33 is supplied to an acoustic optical modulator (AOM) 34 through reflecting mirrors 37, 38 and modulated by image data in the form of a binary value. The modulated laser beam is deflected by a mirror scanner 35 comprising a rotary octahedron, whereby image exposure is carried out by scanning the surface of the photosensitive member 11 at a constant velocity through a focusing lens f-$\theta$ 36. Numeral 39 designates an inspection device for checking the characteristics of the laser beam L.

Among the electrostatic latent images corresponding to each of the colors, what corresponds to yellow is formed by the irradiation of the laser beam modulated by the yellow data, which is the one convered into a binary value using the YP threshold matrix of FIG. 7.

The electrostatic latent image corresponding to yellow is developed by a first developing device 15, and a first toner image (yellow toner image) is formed on the photosensitive member 11. The first toner image is again charged with +600 V by the scorotron on the photosensitive member without being transferred to recording paper P. Subsequently, the laser beam is modulated by magenta converted into a binary value using the threshold matrix MP of FIG. 7 and the laser beam thus modulated is radiated onto the photosensitive member 11 to form an electrostatic latent image. The electrostatic latent image is developed by a second developing device 16 to form the second toner image (magenta toner image). In the same manner, the threshold matrices CP, BKP are successively used and a third as well as a fourth developing devices 17, 18 are successively employed to form the third toner image (cyan toner image) and the fourth toner image (black toner image). These toner images are piled up on the photosensitive member 11 to form four color toner images. These four color toner images are de-electrified by a charge eliminating device 19 and transferred to the recording paper P supplied from a paper feeder 20 through the function of a transfer electrode 24. In this case, numerals 23, 22 represent a paper feeding roller and a guide plate, respectively. The recording paper P retaining the toner image transferred is separated from the photosensitive member 11 by a separation electrode 25 and carried by a guide 26 and a carrier belt 27 to a fixing roller 28 where it is fixed with heat and then discharged onto a paper receiver 29.

On the other hand, upon the completion of the transfer, the photosensitive member 11 is de-electrified by a charge eliminating device 31, which is not used during the formation of the toner images, whereas the toner left on the surface of the photosensitive member 11 is removed by a blade 32 of a cleaning device 30, which is also released during the formation of the toner images, so that the subsequent formation of a multicolor image may be carried out without trouble.

There are four kinds of developing devices used for the apparatus for forming a multicolor image of FIG. 9 and these may be the same or similar ones. FIG. 11 is a cross sectional view of the representative first developing device 15. A developer D is carried in the direction of an arrow G by a magnetic roll 41 having six poles and being driven at a velocity of 1,000 r.p.m. in the direction of an arrow F and a sleeve 42 having a diameter of 30 mm and being rotated at a velocity of 120 mm/sec in the direction of an arrow G. The developer D is a two-component developer and its thickness is so controlled by a developer layer control blade 43 so as to form a developer layer 0.5 mm thick. An agitating screw 45 for thoroughly agitating the developer D is provided in a developer tank 44 and, when the developer D in the developer tank has been consumed, a toner supply roller 46 turns to supply the toner T from a toner hopper 47.

Moreover, a gap 0.8 mm wide is provided between the sleeve 42 and the photosensitive drum 11, wherein a d.c. power supply 48 is installed to apply a developing bias to allow reversal developing. An a.c. power supply 49 is installed in series with the d.c. power supply 48 to oscillate the developer D in a developing region E and supply a sufficient amount of the developer D to the photosensitive drum 11. R designates a protective resistor. The developing bias is provided with a d.c. component of +500 V, an a.c. component of 2 KHz and an effective value of 1.5 KV. The toner T in the developer carried by the sleeve 42 within the developing device 15 is supplied with a charge of 20 $\mu$c/g until it reaches the developing region E.

On the other hand, use can be made of a two-component developer composed of toner and a carrier or one-component developer composed of toner only as the developer for use in such a machine. In the case of the two-component developer, although the quantity of the toner relative to the carrier must be controlled, the advantage is that the charge caused by toner particle friction can be controlled. Moreover, because it is unnecessary to mix a black magnetic substance with toner particles in the two-component developer composed of the magnetic carrier and the non-magnetic toner, color toner free from color turbidity can be used because of the magnetic substance and a clear color image is advantageously usable.

The two-component developer used according to the present invention should preferably be composed of a magnetic carrier as a carrier and non-magnetic toner as toner.

The composition of the toner is as follows:

(1) Thermoplastic resin: binder 80~90 wt%.

Example: polystyrene; styrene acryl polymer; polyester; polyvinylbutyral; epoxy resin; polyamide resin; polyethylene; and ethylene vinegar vinyl copolymer may be added.

(2) Pigment: coloring agent 0~15 wt%.

Example: black: carbon black; cyan: copper phthalocyanin; sulfonamide dielectric dye; yellow: benzidine derivative; magenta: rhodamin B lake, carmine 6B, etc.

(3) Charge control agent: 0~5 wt%.

Plus toner: electron supply dyes of nigglosin series are often used. In addition, alcoxylamine, alkylamide, kylate, pigment; 4-grade ammonium salt; etc.

Minus toner: electron receptive organic complex is effective. In addition, chlorinated paraffin; chlorinated polyester; polyester with excessive acid radical; and chlorinated copper phthalrosianin; etc.

(4) Fluid agent:

Example: colloidal silica and hydro silica are mainly used. In addition, silicon varnish; metal soap; and non-ion surface active agent.

(5) Cleaning agent: for use in prevening the filming of toner in the photosensitive member.

Example: fatty acid surface; oxidized silicon having an organic radical on the surface; and a surface-active agent of the fluorine series.

(6) Filler: intended to improve luster on the surface of the image and reduce material cost.

Example: calcium carbonate; cray; talc; pigment; etc.

Other than the aforementioned materials, a magnetic substance may be contained to prevent photographic fog and the scattering of the toner.

Although 0.1~1 $\mu$m triiron oxide, r-ferric oxide, chrome dioxide, nickel ferrite and iron alloy powder have been proposed as magnetic powder, the triiron oxide is now widely used and 5~70 wt% thereof is mixed with the toner. The resistance of the toner varies with its type and the quantity and, in order to obtain sufficient resistance, it is preferred to add a less than 55 wt% magnetic substance. Moreover, it is also preferred to add a less than 30 wt % magnetic substance to maintain a clear color of the color toner.

As resin suitable for use in fixing toner under pressure, an adhesive resin such as wax, polyolefine, ethylene acetic acid vinyl copolymer, polyurethane or rubber is selected and used in such a manner that it is subjected to plastic deformation with a force of about 20 kg/cm before being glued to paper. Capsular toner may also be used.

Toner can be made using the known method of manufacture and materials.

With the arrangement according to the present invention, the diameter of the toner particle should preferably be about 50 microns in terms of the ordinary average weight/particle diameter in connection with resolving power to obtain a further preferred image. Although there is no theoretic restriction to the toner particle diameter according to the means above, it should preferably be about 1~30 microns in view of resolving power, toner diffusion and carrying. In this embodiment of the present invention, each of the four color toners having an average weight/particle diameter of 10 $\mu$m is used.

In order to obtain fine points and lines or improve the gradient, the magnetic carrier particle should be composed of a magnetic particle and resin, for instance, magnetic powder and resin dispersed therein or a magnetic particle coated with resin. It should preferably be spherical and have an average weight/particle diameter of less than 50 $\mu$m and more preferably less than 30 $\mu$m and more than 5 $\mu$m. In the present embodiment, carrier particles of all four colors having an average weight/particle diameter of 50 $\mu$m were used. The average weight/particle diameter of the toner and the carrier above was measured using a Coulter counter (Coulter Electronics, Inc.).

To prevent a charge from being readily injected into the carrier particle, which tends to impair the formation of a good image, by the bias voltage, that is, the carrier from being readily stuck to the surface of the image retainer and further prevent the occurrence of the problem including insufficiently applied bias voltage, the resistance of the carrier should preferably be set at more than $18^8$ $\Omega$cm, more preferably more than $10^{13}$ $\Omega$cm and most preferably more than $10^{14}$ $\Omega$cm, whereas the particle diameter mentioned above together with the resistance should be employed. In this embodiment, a carrier magnetized at 50 e.m.u. and of a resin dispersed type having a specific resistance of $10^{14}$ $\Omega$cm was used. The specific resistance of the carrier is measured by the following method. That is, particles are put into a container having a cross section of 0.50 cm$^2$ and tapped and then a load of 1 kg/cm$^3$ is applied to the packed particles. Subsequently, voltage allowing an electric field of $10^{2-5}$ V/cm to be generated is applied across the load and the bottom electrode and the value of the current flowing then is read and computed as predetermined to obtain the intrinsic resistance. The thickness of the carrier particle at this time is about 1 mm.

The method of preparing the carrier thus reduced to particles comprises the steps of coating the surface of the magnetic substance with resin using the magnetic substance and the thermoplastic resin as described in reference with the toner or preparing the particles from the resin and fine magnetic substance powder dispersed therein and selecting the particles obtained using average particle diameter selecting means. It is also preferred to make the carrier spherical to let the toner and the carrier be readily agitated and the developer be readily carried and moreover prevent the agglutination of the toner particles or the toner and carrier particles by improving toner charge controllability. The method of preparing the spherical magnetic carrier particle comprises, in the case of what is coated with resin, selecting the most sperical one as a magnetic substance particle and coating it with resin and, in the case of the carrier with a fine magnetic substance particle dispersed therein, selecting the most fine magnetic substance particle and making it spherical using hot air or water after the formation of a dispersing resin particle or directly forming a spherical dispersing resin particle through the spray dry method. When a highly gradient four color image was formed under the conditions above, it offered not only high resolving power and excellent gradation but also clearness with a desired color balance. Moreover, clear characters and diagrams were also obtained. When a four-color image was also formed with a dot pattern whose different color toner dots were overlapped using the threshold matrix of FIG. 8, a clear image with a superior color balance was obtained.

EXAMPLE 2

Figure 12:
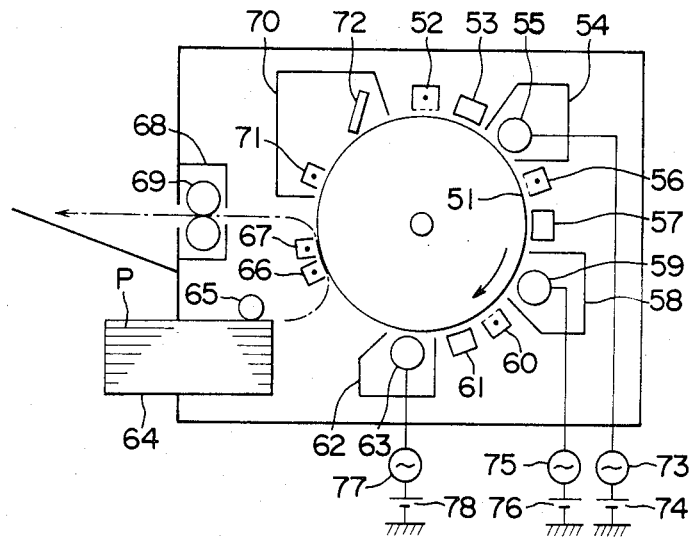
FIG. 12 is a cross sectional view of another apparatus for forming a multicolor image embodying the present invention.

FIG. 12 shows an apparatus for forming a threecolor image illustrating another embodiment of the present invention. The principal difference between this and the above example 1 lies in the fact that a three color, namely, yellow, magenta and cyan color, laminated toner image can be obtained with one turn of a photosensitive drum 51. In FIG. 12, the selenium photosensitive drum is a drum-shaped photosensitive member 200 mm in diameter and rotated at a linear velocity of 150 mm/sec in the direction of an arrow. A scorotron charge device 52, an exposure device 53 and a developing device 54 are, as shown in FIG. 12, arranged on the surface of the photosensitive member 51 to form a yellow toner image. A scorotron charge device 56, an exposure device 57 and developing device 58 are arranged to form a magenta toner image. Furthermore, a scorotron charge device 60, an exposure device 61 and developing device 62 are arranged to form a cyan toner image. Accordingly, three-color toner images are piled up within a cycle of the photosensitive member 51. In the present embodiment, the photosensitive member 51 is charged with +700 V by the scorotron charge devices 52, 56, 60.

Figure 13:
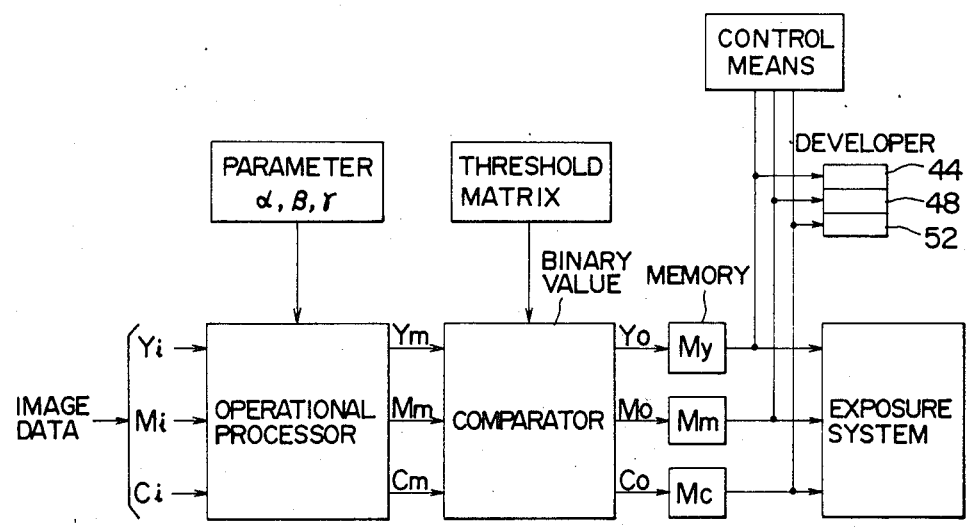
FIG. 13 is a block diagram of a system for correcting the data of an image supplied to the exposure system of the apparatus of FIG. 2.

Subsequently, the process for three-color image exposure and the formation of an equivalent image will be described. The image data stored in memories are input to operational processors of color correcting means of FIG. 13 and, for instance, desired color data are computed by the following equation (II).

Equation (II):

$$Ym = a_1 Yi + \beta_1 Mi + \gamma_1 Ci$$

$$Mm = a_2 Yi + \beta_2 Mi + \gamma_2 Ci$$

$$Cm = a_3 Yi + \beta_3 Mi + \gamma_3 Ci$$

where Ym, Mm, Cm = data after computation; Yi, Mi, Ci = image data input; $a_1$, $a_2$, $a_3$, $\beta_1$, $\beta_2$, $\beta_3$, $\gamma_1$, $\gamma_2$, $\gamma_3$ =, for instance, color correcting coefficient of 1, 2, 3, etc. and determined by external factors such as the composition of the developer and the voltage applied to the developing device. The data Ym, Mm, Cm subjected to color correction are converted into a binary value after being compared with the threshold matrix of FIG. 7 or 8 as is the case with the first example and set as data Yo, Mo, Co. These data are stored in the memories My, Mm, Mc and supplied to the exposure system under the instructions from the control means. In this example, light emitting diodes (LED) 53 (for yellow), 57 (for magenta) and 61 (for cyan) are used to expose respective color images and form electrostatic latent image on the photosensitive member 51.

Each of the electrostatic latent images is developed by the corresponding developing devices 54 (for yellow), 58 (for magenta) and 62 (for cyan), whereby each color toner image is successively superposed on another. Although the same types of developing devices 15 as what is shown in FIG. 11 of the example 1, an effective value of 1.5 KV with a d.c. bias component +600 V from a power supply 74 and an a.c. bias component 2 KHz from a power supply 73 is applied to the developing device 54 through a sleeve 55.

To the developing device 58, an effective value of 1.2 KV with a d.c. bias component +600 V from a power supply 76 and an a.c. bias component 2 KHz from a power supply 75 is applied through a sleeve 59, whereas to the developing device 62, an effective value of 1.0 KV with a d.c. bias component +600 V from a power supply 78 and an a.c. bias component 2 KHz from a power supply 77 is applied through a sleeve 63. Each of the color toner images is deverloped on a non-contact basis under the above conditions.

Each of the color toner images is transferred onto recording paper P through the function of a transfer electrode 66, the paper P being supplied from a paper feeder 64 to a paper feeding roll 65. Then the recording paper P is separated from the photosensitive member 51 by a separating electrode 67, fixed by a hot roll 69 of a fixing device 68 with heat and discharged. The charge and the toner left on the photosensitive member 51 are de-eliminated and removed by a charge eliminating device 71 and a blade 72 of a cleaning device 70 in preparation for the following formation of an image.

In this example as in the case of the example 1, a three-color image was prepared without superposing different color dots, and with the lamination of dots by changing the distribution angle of the dots. It was then proved that the image obtained offered high resolving power and clearness with an excellent color balance. Moreover, a desired tone was obtained by adjusting the parameters $\alpha$, $\beta$, $\gamma$ of FIG. 13.

Obviously in the method of forming a multicolor image comprising piling a plurality of toner images on an image retainer, the resolving power and the color balance of the multicolor image can be improved by expressing the gradation of the toner image with the difference size of the dot and a clearer multicolor image is effectively obtained.

A further embodiment of the present invention will be described subsequently.

As the developer D in the above examples is caused to be carried without contacting the photosensitive member 11, the toner is impelled to the latent image by the a.c. bias. In that case, electric force directing the toner particles to and from the photosensitive member 11 acts on the particles located between the photosensitive member 11 and the developing devices (for instance, 15, 16, 17) because of the a.c. current phase changing moment by moment. The latter causes the toner on the photosensitive member to flow back to the developing devices and may allow a different color toner to enter the developing device.

The following measures can be taken to counter the above problem while toner images are superposed.

(i) Toner having a larger charge quantity is successively used;

(ii) The amplitude and/or frequency of the a.c. component of the developing bias is successively decreased;

(iii) The developing device being not used is put away from the photosensitive member 11;

(iv) The quantity of toner supplied is gradually increased;

(v) The potential contrast of the latent image is gradually increased;

(vi) The gap d between the photosensitive member 11 and the developer layer is gradually increased; and (vii) The bias (the same polarity as that of the toner) is applied so as to prevent different toner from entering the developing device being not used.

Referring to FIG. 14, the functions of the operational processor in another apparatus for forming a color image embodying the present invention will subsequently be described. The input image data is divided into regions having a predetermined size and operational processing is carried out on a region basis. In other words, the density data Yi, Mi, Ci, BKi of yellow, magenta, cyan and black are processed according to the algorithm of an operational process (described later), converted into Yo, Mo, Co, BKo and stored in the memories My, Mm, Mc, $M_{BK}$. When the whole image data to be recorded has been computed and processed, the density data stored in the memories are taken out under instructions from the control means and the exposure device and the corresponding developing device is driven according to the data on a color basis and a color toner image is formed on the photosensitive member 11.

Referring to FIGS. 15(a), 15(b) and FIGS. 16(a), 16(b), the algorithm of the operational process will subsequently be described. FIGS. 15(a), 15(b) are histograms illustrating the sum total of color density levels by colors within a region thus divided. Taking the data of FIG. 15(a) as an example, FIG. 15(a) is converted to FIG. 15(b) utilizing that black is obtained when three primary colors of yellow, magenta and cyan having equal density levels are blended. That is, the portion Yi displaying a minimum density value in the input data is subtracted from the data Yi, Mi, Ci and replaced with black. This is expressed by the following equation.

$$Yo = Yi - min(Yi, Mi, Ci)$$

$$Mo = Mi - min(Yi, Mi, Ci)$$

$$Co = Ci - min(Yi, Mi, Ci)$$

$$Bo = Bi + min(Yi, Mi, Ci)$$

FIGS. 16(a), 16(b) illustrate the color density data of each color allotted to each picture element within a region (composed of 4×4 picture elements) thus divided in FIGS. 15(a), 16(b). In FIG. 16(a), the input data are directly allotted, whereas in FIG. 16(b) the data converted by the aforementioned equation are allotted. A comparison of FIGS. 16(a), 16 (b) allows the conversion of a fairly large number of data out of the three primary color data into black, so that the quantity of toner stuck because of development may be decreased. As a result, the quantity of the toner consumed may effectively be saved in the first place. Secondly, the problem which occurs when reversal development is repeated on the same photosensitive member in that the toner images are not readily superposed can be solved because the density of the toner stuck to the photosensitive member 11 is reduced and color reproduction is not seriously obstructed. Accordingly, the quantity of the toner consumed is decreased and a color image offering an excellent color balance can be obtained.

In the operational process based on the algorithm, any input data may be used, provided that it contains color data. In the case of a television image for instance wherein it is scanned by an electron beam according to the signal transmitted and the luminance of three primary colors, blue, green and red is indicated through the additive processes, they are converted into the density levels of three primary colors, yellow, magenta and cyan through the subtractive color process by taking the difference between each level and the saturated quantity of the three primary colors. The analog output signals of Y, M, C of the pickup element may directly be used as input data for operational processing and moreover it is possible to use the analog signal converted into a digital form or, if necessary, what is supplied with additional different data. The aforesaid color data may be more than three-color or multicolor data.

FIG. 17 shows the operating timing of each image forming device in the apparatus for forming a color image according to the present invention. The horizontal axis represents each image forming cycle time (second), whereas the vertical axis represents the operation of each device. In FIG. 17, a bias of +500 V is applied to the developing device without operating during four developing processes to prevent different color toner from entering the device and a bias of −300 V is applied thereto immediately before and after development to prevent the toner from flying out. The magnetic roll and the sleeve are so controlled as to rotate only at the time development. When a four-color image was formed under such conditions, a clear color image free from distortion with a good color balance was obtained.

As set forth above, the quantity of the toner consumed for development can be saved by carrying out the operational process to convert the three primary color density common to one another in the input data as color correcting means for the apparatus for forming a color image according to the present invention. The shortcoming attributed to the formation of a color image by superposing multicolor toner images on the photosensitive member can be remedied, whereas a clear image free from disturbance with a good color balance can effectively be obtained.

Referring to still another embodiment of the present invention as shown in FIGS. 18(a)~18(c), 19(a)~19(c), the algorithm of the operational process will be described. FIGS. 18(a)~18(c) show historams of the sum of color density levels by colors within a region thus divided. Taking the input data shown in FIG. 18(a) as an example, FIG. 18(a) is converted into FIG. 18(b) utilizing black obtained when three primary yellow, magenta and cyan colors having an equal density level. That is, the portion Ci displaying a minimum density out of the input data is subtracted from the data Yi, Mi, Ci and the rest is replaced with the black component. The image data thus processed contributes to the reduction of the toner quantity stuck to the photosensitive member 11 and the advantage is that the quantity of the toner consumed can be saved to a greater extent. However, there is still posed a problem in that, because the following toner image is not readily superposed on the preceding one when toner images are successively piled on the photosensitive member by reversal development, the tone of the preceding toner image is over-emphasized.

In this example, the operational process of the image data is not limited to the replacement of the density level to solve the above problem and the parameter for the operational process is so arranged as to be externally determined. The parameter may be determined by, for instance, detecting the composition of the developer, the bias voltage to the developing device and the order of each color toner development and feeding back the results obtained. Furthermore, it may be determined by the operator's manual operation based on the data determined experimentally.

The method of operationally processing the aforementioned image data is expressed by the following equation:

$$Bo = \alpha_2 Bi + \beta_2 \min(Yi, Mi, Ci)$$

$$Yo = \alpha_2 Yi + \beta_2 \min(Yi, Mi, Ci)$$

$$Mo = \alpha_3 Mi + \beta_3 \min(Yi, Mi, Ci)$$

$$Co = \alpha_4 Ci + \beta_4 \min(Yi, Mi, Ci)$$

where $Bi, Yi, Mi, Ci$ = each color input data showing the density of black, yellow, magenta, cyan being input to the operational processor; $Bo, Yo, Mo, Co$ = each color data indicating the density of black, yellow, magenta, cyan converted by the operational processor; $\min(Yi, Mi, Ci)$ = data designating a minimum density among three primary color data $Yi, Mi, Ci$; and $\alpha_1, \alpha_2, \alpha_3, \alpha_4, \beta_1, \beta_2, \beta_3, \beta_4$ = parameters externally instructed. The histogram of each color density level of input data $Yi, Mi, Ci, Bi$ is shown in FIG. 18(a), whereas the histogram of each color density level of the data $Yo, Mo, Co, Bo$ obtained by computing the parameters $\alpha_1$ through $\alpha_4$ and $\beta_1$ through $\beta_4$, assuming that they are all one and the toner is developed in the order of yellow, magenta, cyan and black, is shown in FIG. 18(b). The histogram when the parameter $\beta_2$ is set at 1.5, is shown in FIG. 18(c). (However, Yo' indicates the data converted to yellow when $\beta_2$ is set at 1.5.)

FIGS. 19(a)~19(c) correspond to each of FIGS. 18(a)~18(c). In FIG. 19(a), the input data of FIG. 18(a) are directly allotted, whereas in FIG. 19(b), 19(c) the data converted by the operational processor are allotted. A comparison of FIGS. 19(a)~19(c) shows that the quantity of toner adhering to the photosensitive member 11 in the case of data conversion shown in FIGS. 19(b), 19(c) is by far smaller than that in FIG. 19(a). Particularly in FIG. 19(c), the yellow toner image precedingly develop is suppressed and the color balance is seen to have been optimized.

In the operational processing by the algorithm, any input data may be used as far as it contains color data. For instance, the luminance levels of blue, green and red are defined as three primary colors through the additive processes when a television image is transmitted but, if the difference between the saturated quantities at the color levels is obtained, they are converted to the density levels of three primary colors, yellow, magenta and cyan through the subtractive color process. Moreover, the analog output signals of yellow, magenta and cyan of a pickup element may directly be used as the input data of the operational processing. It is also possible to digitalize the analog data and, if necessary, add different data to provide the input data.

The color data in the apparatus for forming a color image as above described is applicable to more than three to four colors.

FIG. 17 shows the operating timing of each image forming device in the apparatus for forming a color image in this example.

As set forth above, according to this embodiment, the shortcoming when multicolor toner images are piled up to form a color image can be remedied by subjecting the color data to the operational process and conversion according to instructions based on external data as means for correcting colors in the apparatus for forming a color image, whereas a clear image free from disturbance with a good color balance can effectively be obtained.

An additional embodiment of the present invention will subsequently be described. As the semiconductor laser beam source, a semiconductor device 120 having a double heterostructure of gallium, aluminum or arsenic series shown in FIG. 20 is used. In FIG. 20, there is shown such a semiconductor device comprising an upper electrode 121, a lower electrode 125 to which a data signal subjected to color correction is applied, an upper clad layer 122 composed of P-Alz.Ga(1-y).As, an active layer 123 composed of n-Alx.Ga(1-x).As, a lower clad layer 124 composed of n-Aly.Ga(1-y).As, a substrate 125 composed of n-Ga.As and a laser beam L oscillating out of the active layer 123. However, X, Y, Z takes either value of 0 or 1.

Although the oscillating wavelength of such a semiconductor laser beam is relatively as long as 700 to 830 nm, as a photosensitive member suitable for the semiconductor laser beam, the use of a functional separated type photosensitive member composed of a charge generating layer (CGL) and a charge transport layer (CTL) is preferred. In other words, a Se evaporated layer containing 10~40 wt% tellurium, a resin dispersed layer containing a photoconductive bisazo pigment or triceazo pigment, a hydrogenized nitrigenized amorphous silicon evaporated layer, a resin dispersed layer containing vanadilphtharosianin pigment and the like is used as the CGL. As the CTL, for instance, polyvinylcarbazole, a polyallylalkan amino compound, an oxisadiazole derivative, sellenium evaporated layer, etc. are used.

Figure 21:
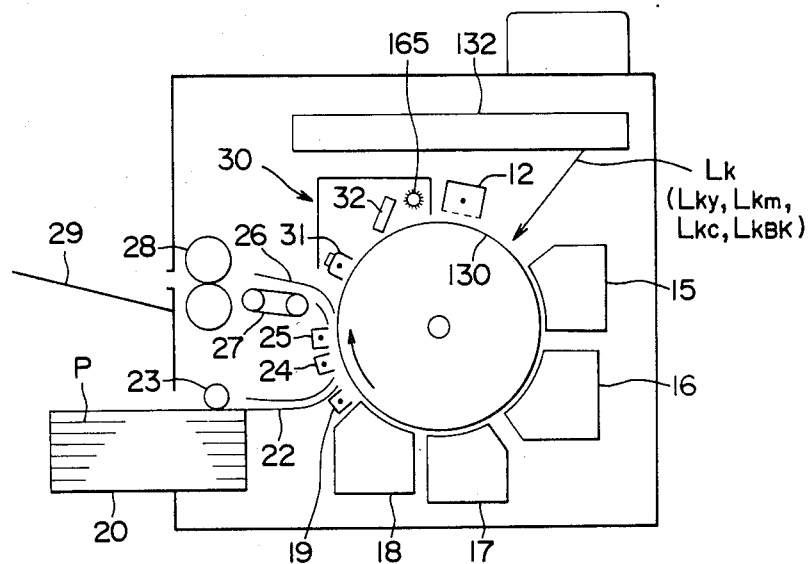
FIG. 21 is a cross sectional view of still another apparatus for forming a multicolor image.
Figure 22:
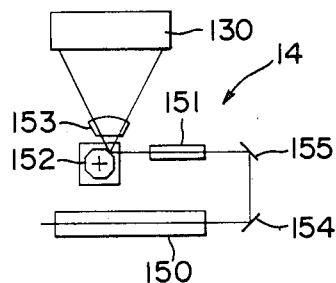
FIG. 22 is a cross sectional view of an image exposure system using a semiconductor laser.

FIG. 21 shows the cross section of the apparatus for forming a multicolor image in this embodiment. FIG. 21 shows the cross section of a laser beam exposure device. FIG. 22 shows current modulation characteristics.

FIG. 21, a drum photosensitive member 130 having a diameter of 120 mm comprises a CGL with sellenium 1 μm thick being evaporated on a drum aluminum substrate, the sellenium containing 35 wt% tellurium, and a CTL formed thereon with sellenium 20 μm. The drum photosensitive member 130 is turned at a peripheral velocity of 120 mm/sec in the direction of an arrow. A laser beam Lk is generated by a laser beam exposure device 132. The construction of the exposure device 132 is shown in FIG. 22. A beam source 150 has a double heterostructure (DH) of gallium. arsenic-gallium. aluminum. arsenic as shown in FIG. 20 and generates a beam of 750 nm at 15 mw.

Figure 23:
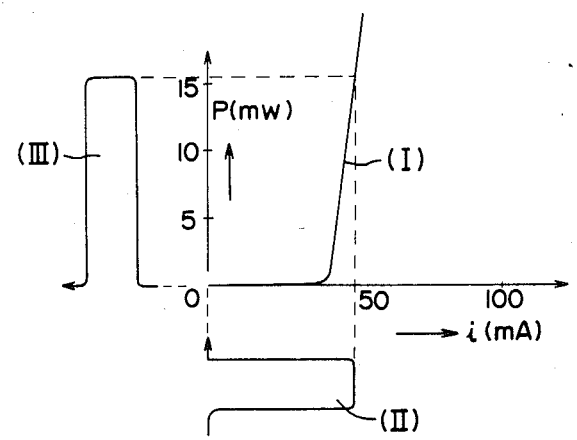
FIG. 23 is a diagram illustrating the relation between signal current and a laser oscillating output.

As shown in FIG. 23, the output characteristics of the laser beam source 150 are such that the output P (mw) slightly increases as current i (mA) increases and, when the current i reaches a predetermined level, it produces laser oscillation and sharply increases its output. When a pulse current (II) is charged, a sharp laser oscillating output like (III) is obtained. The laser beam from the beam source 150 of FIG. 22 is changed into a parallel beam by a collimate lens 151 through reflecting mirrors 154, 155 and reflected by a polygon 152 and then irradiated on the photosensitive member 130 through a fθ lens 153.

In FIG. 21, after the photosensitive member 130 is charged beforehand with +600 V by a charge device 12, it is subjected to image exposure by a laser beam Lky modulate by yellow data to form an electrostatically charged image, which is developed by a developing device 15, whereby a first toner image (yellow toner image) is formed. A developer D stored in the developing device 15 is a two-component developer comprising a mixture of the toner and a carrier at 1:9 weight ratio.

The toner contains as coloring agent, a benzidine derivative and as a charge controlling agent, a nigrosin dye, of an average weight/particle diameter of 10 μm, and a specific resistance of more than $10^{14}$ Ωcm, with triiron dispersed in resin. The carrier has an average weight/particle diameter of 30 μm, magnetization at 50 emu/g and a specific resistance of more than $10^{14}$Ωcm.

Above average weight/particle diameter is measured by Courter counter (made by Courter Electronics, Inc.).

In the apparatus for forming a multicolor image according to the present embodiment, after the image data from a multicolor document is processed by the operational processor as shown in FIG. 14, the data is sent to the laser beam source 150 of FIG. 22. According to the signal of the corrected image data, the current i (mA) of FIG. 23 for driving the beam source 150 is controlled and the intensity P (mw) of the laser beam oscillated from the beam source 150 is modulated. When the laser beam Lk thus modulated in terms of its intensity is irradiated on the uniformly charged photosensitive merber 130, because the charge quantity diffused according to the intensity of the laser beam Lk varies, an electrostatiacally charged image with gradation corresponding to the data signal is formed on the photosensitive member. Consequently, a multicolor toner image having gradation is obtained by developing electrostatically charged image using a different color toner.

As set forth above, by using a semiconductor laser as the light source of the image exposure device for the apparatus for forming a multicolor image in the present embodiment, the quantity of the power consumption of the light source can be reduced and at the same time the exposure device is made compact and less costly, whereas a multicolor image with gradation and a superior color balance can effectively be obtained.

What is claimed is:

1. A color image forming apparatus comprising means for applying an original image data consisting of a plurality of different color informations for conversion, means for converting said original image data, means for forming a latent image on a single image retainer on the basis of a result of said converting means, a plurality of developing means for developing said latent image with toners of mutually different colors, means for transferring a toner image formed on said image retainer to a transfer material, wherein toner images of a plurality of mutually different colors form a multicolor toner on said image retainer by repeating the formation and development of said latent image and are transferred in one step onto said transfer material.

2. An apparatus for forming a multicolor image as claimed in claim 1, wherein at least in and after a second development using said development means is implemented on a non-contact condition.

3. An apparatus for forming a multicolor image as claimed in claim 1, wherein said operational processor executes comparing color components of said image data, and converting said image data based on the results of said comparing.

4. An apparatus for forming a multicolor image as claimed in claim 3, wherein the output of the converting color component is obtained from the difference between the value of a minimum density among yellow, magenta and cyan components in image input data and a color component intended for outputting.

5. An apparatus for forming a multicolor image as claimed in claim 3, wherein at least in and after a second development using said development means is implemented on a non-contact condition.

6. An apparatus for forming a multicolor image as claimed in claim 1, wherein said operational processor operates to convert the color tone of said image data according to an external signal.

7. An apparatus for forming a multicolor image as claimed in claim 6, wherein the parameter given by the external signal is multiplied by the value of the minimum density component among the yellow, magenta and cyan components of said image input data and a value obtained from operations with the value obtained from the multiplication as a factor is used as the converting color component output.

8. An apparatus for forming a multicolor image as claimed in claim 6, wherein at least in and after second development using said development means is implemented on a non-contact condition.

9. In a color image forming method comprising forming a latent image composed of dots on an image retainer, successively developing said latent image by using a plurality of developing means for developing the latent image with toners of mutually different colors to form a multicolor toner image on said image retainer, and transferring the multicolor toner image to a transfer material, the improvement comprising varying the gradation of the image by varying said dots in size.

10. A method for forming a multicolor image as claimed in claim 9, wherein at least in and after second development of the plurality of color toner images is carried out on a non-contact condition.

11. A method for forming a multicolor image as claimed in claim 9, wherein at least two kinds of color toner images among the plurality of color toner images are composed of dots arranged at mutually different angles.

12. A method for forming a multicolor image as claimed in claim 11, wherein at least in and after second development of the plurality of color toner images is carried out on a non-contact condition.

13. In a color image forming apparatus comprising means for operating an original image data consisting of a plurality of different color imformations for conversion, means for forming a latent image on a single image retainer on the basis of a result of said operating means, a plurality of developing means for developing the formed latent image with toners of mutually different colors, and means for transferring a toner image formed on said image retainer to a transfer material, the improvement characterized in that said latent image forming means has an exposure light source which can be intensity modulated according to said operating result and toner images of a plurality of mutually different colors form a multicolor toner image on said image retainer by repeating the formation and development of the latent image and then transferred in one step onto said transfer material.

* * * * *